US011884080B2

(12) United States Patent
Sanada

(10) Patent No.: US 11,884,080 B2
(45) Date of Patent: Jan. 30, 2024

(54) LABEL PRINTER

(71) Applicant: TOSHIBA TEC KABUSHIKI KAISHA, Tokyo (JP)

(72) Inventor: Tsuyoshi Sanada, Susono Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 128 days.

(21) Appl. No.: 17/510,422

(22) Filed: Oct. 26, 2021

(65) Prior Publication Data

US 2022/0242139 A1 Aug. 4, 2022

(30) Foreign Application Priority Data

Feb. 2, 2021 (JP) ................................ 2021-017037

(51) Int. Cl.

| | |
|---|---|
| ***B41J 2/33*** | (2006.01) |
| ***B41J 2/335*** | (2006.01) |
| ***B41J 11/00*** | (2006.01) |
| ***B41J 3/407*** | (2006.01) |

(52) U.S. Cl.

CPC ............. *B41J 2/335* (2013.01); *B41J 3/4075* (2013.01); *B41J 11/0045* (2013.01)

(58) Field of Classification Search

CPC ........ B41J 2/335; B41J 3/4075; B41J 25/304; B41J 11/0045; B41J 11/005; B41J 25/312; B41J 25/316

See application file for complete search history.

(56) References Cited

U.S. PATENT DOCUMENTS

2016/0052319 A1* 2/2016 Katayama ................ B41J 29/13 347/222

FOREIGN PATENT DOCUMENTS

| | | |
|---|---|---|
| JP | 1989-040659 | 3/1989 |
| JP | 2006-150701 | 6/2006 |
| JP | 2015-168207 | 9/2015 |

* cited by examiner

*Primary Examiner* — Kristal Feggins

(74) *Attorney, Agent, or Firm* — Amin, Turocy & Watson, LLP

(57) ABSTRACT

According to one embodiment, there is provided a label printer in which noise is less likely to be generated when a thermal head comes into contact with a backing sheet between a label and a label. In a label printer that prints, using a thermal head including a linear heating element, on a label sheet in which labels are attached on a strip-shaped backing sheet at a predetermined interval, the thermal head is configured to swing with respect to a platen roller configured to support the label sheet at a printing position, and a guide portion includes an edge portion that is substantially parallel to a surface of the thermal head having the heating element provided thereon and that is inclined with respect to the heating element is integrally provided downstream of the thermal head in a sheet conveying direction.

20 Claims, 5 Drawing Sheets

LABEL PRINTER

CROSS-REFERENCE TO RELATED APPLICATION

This application is based upon and claims the benefit of priority from Japanese Patent Application No. 2021-017037, filed on Feb. 5, 2021, the entire contents of which are incorporated herein by reference.

FIELD

Embodiments described herein relate to a label printer.

BACKGROUND

A label printer prints, using a printing head (thermal head) including a linear heating element, on a sheet (label sheet) in which labels are attached on a strip-shaped backing sheet at a predetermined interval. The heating element prints on a portion of the label sheet supported by a platen roller. The thermal head is biased in a direction to press the label sheet against the platen roller. As a result, the label sheet is sandwiched between the heating element and the platen roller.

In such a label printer, there is a problem that, when the thermal head comes into contact with the backing sheet between the label and the label due to conveying of the label sheet, noise is generated by moving a drop between the label and the backing sheet with a biasing force of the thermal head.

Regarding a countermeasure against noise of a thermal head of a printer that prints using a thermal head or a label printer that prints on a label sheet, or a guide for the sheet to be conveyed, various techniques in related arts are proposed, but these techniques do not solve the problem described above.

DETAILED DESCRIPTION

In general, according to one embodiment, there is provided a label printer in which noise is less likely to be generated when a thermal head comes into contact with a backing sheet between a label and a label.

A label printer of an embodiment prints, using a thermal head including a linear heating element, on a label sheet in which labels are attached on a strip-shaped backing sheet at a predetermined interval, the thermal head is configured to swing with respect to a platen roller configured to support the label sheet at a printing position, and a guide portion including an edge portion that is substantially parallel to a surface of the thermal head having the heating element provided thereon and that is inclined with respect to the heating element is integrally provided downstream of the thermal head in a sheet conveying direction.

Hereinafter, the embodiment of the label printer will be described in detail with reference to accompanying drawings. The embodiment described below is an example of the label printer, and does not limit a configuration, a specification, or the like of the label printer.

Figure 1:
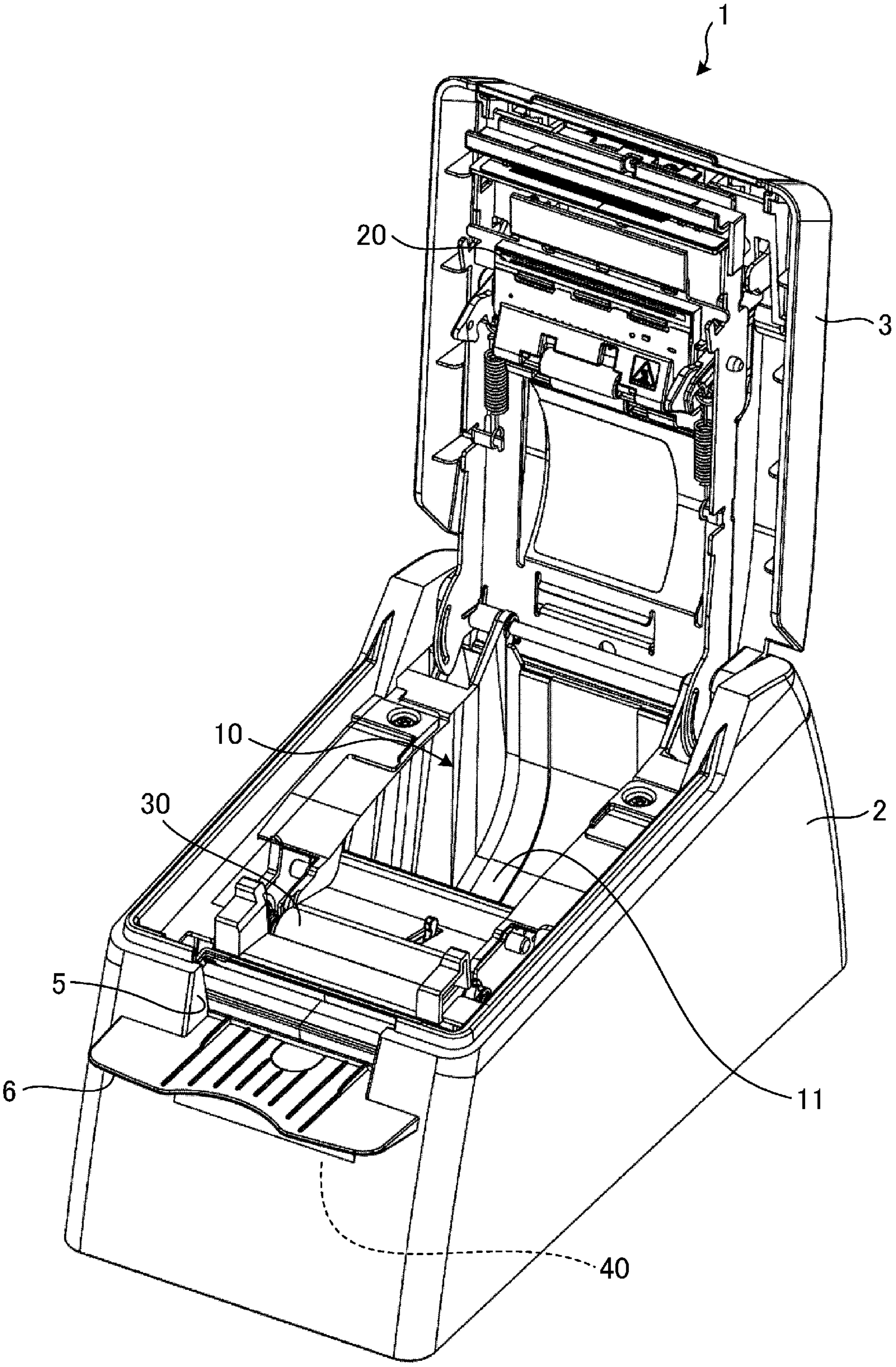
FIG. 1 is a perspective view showing a state where an upper case of a label printer according to an embodiment is opened.
Figure 2:
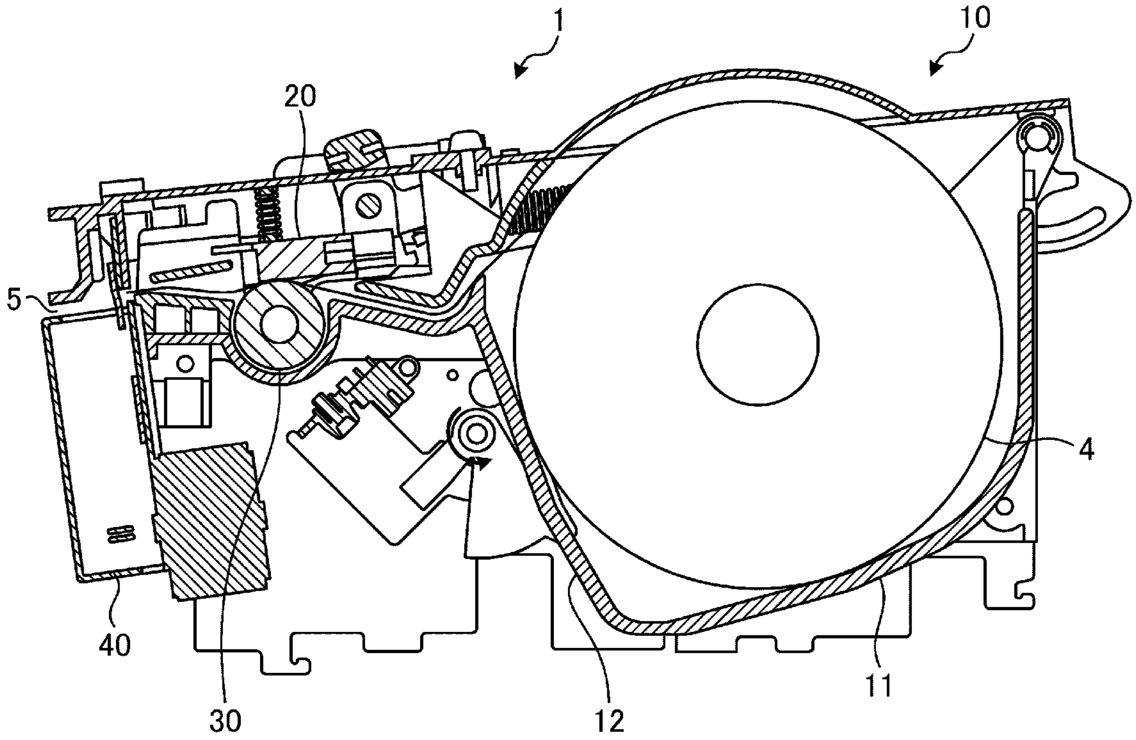
FIG. 2 is a longitudinal sectional view showing an internal structure of the label printer.

FIG. 1 is a perspective view showing a state where an upper case 3 of a label printer 1 according to the embodiment is opened. FIG. 2 is a longitudinal sectional view showing an internal structure of the label printer. The label printer 1 includes a lower case 2, the upper case 3, a discharge port 5, a discharge table 6, a storage portion 10, a thermal head 20, a platen roller 30, a cutter 40, and the like.

A housing of the label printer 1 includes the lower case 2 and the upper case 3, and the storage portion 10, the thermal head 20, the platen roller 30, and the like are built in an inside of the housing. The housing protects built-in components from external impact, dust, or the like.

The lower case 2 is a substantially rectangular parallelepiped container having an opening portion on an upper surface thereof. The opening portion of the lower case 2 is opened and closed by the upper case 3. In addition, the lower case 2 is provided with a connection terminal (not shown) that is used for connecting the label printer 1 with an external device, a power supply terminal (not shown) that supplies power to the label printer 1, and the like.

One end portion of the upper case 3 is rotatably attached to the lower case 2, and the opening portion of the lower case 2 is opened and closed as the upper case 3 rotates. The upper case 3 is used as a lid that opens and closes an opening through which a label sheet 4 stored in the storage portion 10 is taken out (or replenished).

The discharge port 5 is formed by a gap between the lower case 2 and the upper case 3, and the label sheet 4 on which transaction contents are printed is discharged to an outside of the housing from the discharge port 5. The discharge table 6 is provided so as to protrude forward of the discharge port 5, and supports the label sheet 4 discharged from the discharge port 5.

The label printer 1 further includes a control unit (not shown). The control unit controls an overall operation of the label printer 1 to realize various functions of the label printer 1, and includes a central processing unit (CPU), a read only memory (ROM), and a random access memory (RAM). The CPU comprehensively controls the operation of the label printer 1. The ROM is a storage medium that stores various programs and data. The RAM is a storage medium that temporarily stores various programs and various data. Further, the CPU executes a program stored in a storage medium such as the ROM by using the RAM as a work area.

The storage portion 10 stores the label sheet 4. The label sheet 4 is obtained by winding, in a roll shape, a sheet in which labels 42 are attached on a strip-shaped backing sheet 41 at a predetermined interval (in FIG. 5, the backing sheet is denoted by reference numeral 41, and the labels are denoted by reference numeral 42). The storage portion 10 supports the roll-shaped label sheet 4 by a so-called throw-in method. That is, the storage portion 10 does not support a central axis portion of a roll of the label sheet 4, and holds an outer peripheral surface of the label sheet 4 by a recessed shape having a substantially U-shaped cross section.

Figure 3:
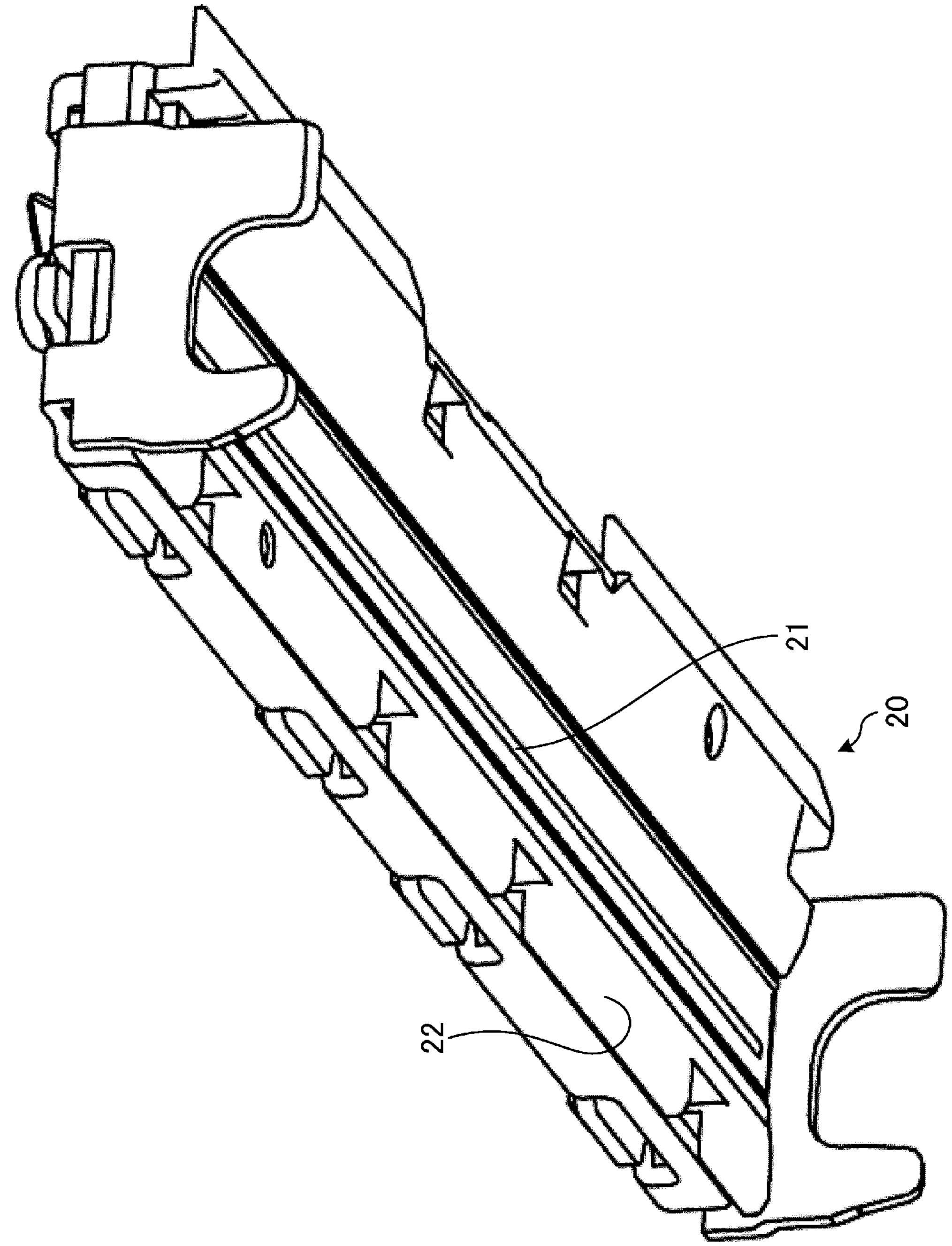
FIG. 3 is a perspective view showing a state where a thermal head is viewed from below.

The thermal head 20 is provided inside the upper case 3. Here, FIG. 3 is a perspective view showing a state where the thermal head 20 is viewed from below. For example, the thermal head 20 includes a linear heating element 21. In addition, the thermal head 20 can swing with respect to the platen roller 30. Further, the thermal head 20 is biased by a spring or the like in a direction away from an inner surface of the upper case 3 so as to press the heating element 21 against the platen roller 30 in a state where the upper case 3 is closed.

In addition, the thermal head 20 includes a sheet guide 22 which is an example of the guide portion, on the downstream side in the sheet conveying direction. The sheet guide 22 guides the label sheet 4. More specifically, the sheet guide 22 limits a height direction position of a portion of the label sheet 4 that passes through the thermal head 20. A shape of the sheet guide 22 will be described later in detail.

Returning to FIG. 2, the platen roller 30 is provided inside the lower case 2. The platen roller 30 is made of, for example, an elastic material such as rubber. The label sheet 4 drawn out from the storage portion 10 is pressed against the platen roller 30 by the thermal head 20. The platen roller 30 is rotated by a driving force of a motor or the like. As a result, the thermal head 20 and the platen roller 30 draw out the label sheet 4 wound in a roll shape and stored in the storage portion 10 to print various kinds of information on the label sheet 4. The thermal head 20 and the platen roller 30 constitute a printing unit.

The label printer 1 includes the cutter 40 that cuts the label sheet 4, at a position downstream of the printing unit inside the lower case 2 in the conveying direction. When conveying of the label sheet 4 performed by the thermal head 20 and the platen roller 30 is completed, the cutter 40 pushes up a movable blade. As a result, the label printer 1 cuts the label sheet 4.

Figure 4:
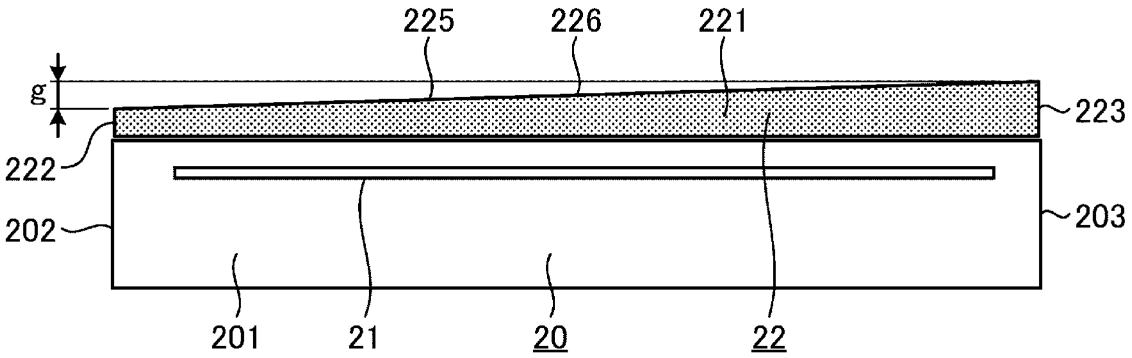
FIG. 4 is a schematic bottom view illustrating a shape of a sheet guide attached to the thermal head.
Figure 5:
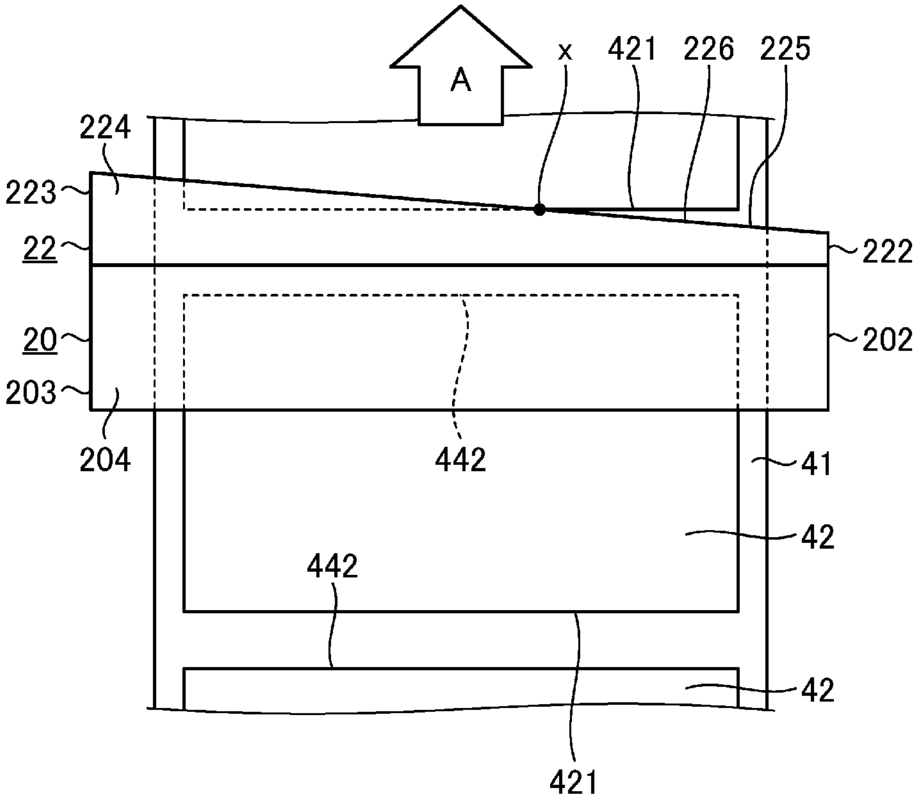
FIG. 5 is a plan view illustrating an operation of the sheet guide on a label sheet being conveyed.

An operation of the sheet guide 22 in the present embodiment will be described below. FIG. 4 is a schematic bottom view illustrating the shape of the sheet guide 22 attached to the thermal head 20. FIG. 5 is a plan view illustrating the operation of the sheet guide 22 attached to the thermal head 20, on the label sheet 4 being conveyed. In FIG. 5, the sheet conveying direction is shown by an arrow A.

The sheet guide 22 of the present embodiment has a substantially trapezoidal shape when viewed from a side where the heating element 21 is provided, and a surface 225 on the downstream side in the sheet conveying direction is inclined with respect to a width direction of the label sheet 4. Here, reference numeral 221 denotes a lower surface of the sheet guide 22, reference numeral 222 denotes a smaller end surface of the sheet guide 22, reference numeral 223 denotes a larger end surface of the sheet guide 22, and reference numeral 224 denotes an upper surface of the sheet guide 22.

In addition, reference numeral 201 denotes a lower surface of the thermal head 20, reference numeral 202 denotes one end surface of the thermal head 20, reference numeral 203 denotes the other end surface of the thermal head 20, and reference numeral 204 denotes an upper surface of the thermal head 20. The lower surface 201 and the lower surface 221 of the sheet guide 22 are substantially parallel to each other and adjacent to each other. The end surface 202 is a surface adjacent to the end surface 222, and the end surface 203 is a surface adjacent to the end surface 223.

Reference numeral 226 denotes a side between the surface 225 on the downstream side in the sheet conveying direction and the lower surface 221 (that is, a side of the lower surface 221 on the downstream side in the sheet conveying direction). As shown in FIGS. 4 and 5, the lower surface 221 and the upper surface 224 each have a substantially trapezoidal shape. Here, the side 226 is an example of an edge portion of the guide portion. With the above configuration, the sheet guide 22 (an example of the guide portion) has the edge portion (side 226) that is substantially parallel to the surface (the lower surface 201) of the thermal head 20 having the heating element 21 provided thereon, and that is inclined with respect to the heating element 21.

As shown in FIG. 4, the side 226 between the surface 225 and the lower surface 221 is inclined with respect to the width direction of the label sheet 4, so that there is a difference (denoted by reference numeral g) in the sheet conveying direction between positions of both end portions of the sheet guide 22 in the width direction. As a value of the difference g, an appropriate value, which is calculated based on a thickness range of the labels 42 used in the label printer 1, a size of the heating element 21, and the like, is set.

Such a sheet guide 22 is in contact with the label sheet 4 by the side 226 on the downstream side in the sheet conveying direction. Thus, as shown in FIG. 5, a side 421 of the label 42 on an upstream side in the sheet conveying direction and the side 226 intersect with each other. An intersection x moves in the width direction of the sheet (a right direction in the drawing) along the side 226 with moving of the label sheet 4 (denoted by the arrow A).

Figure 6:
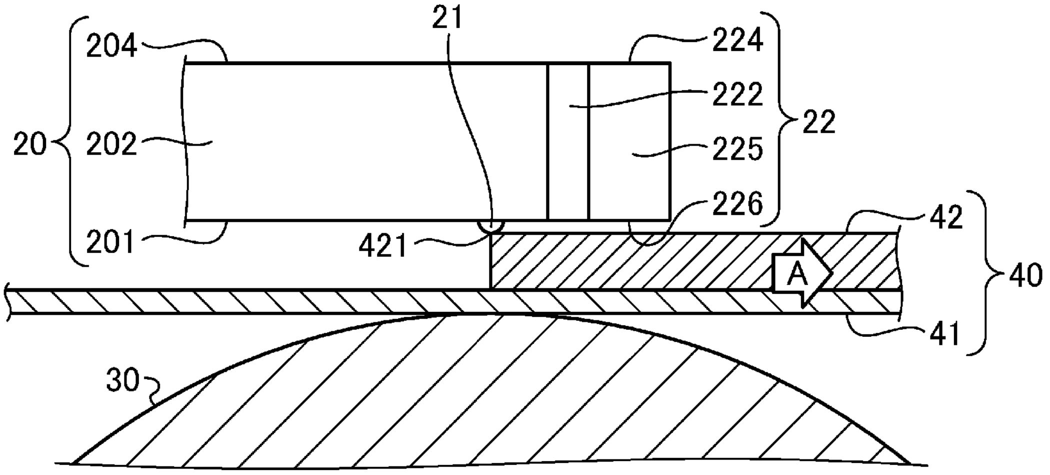
FIG. 6 is an enlarged longitudinal sectional view showing a positional relationship between the sheet guide and the label sheet being conveyed.
Figure 7:
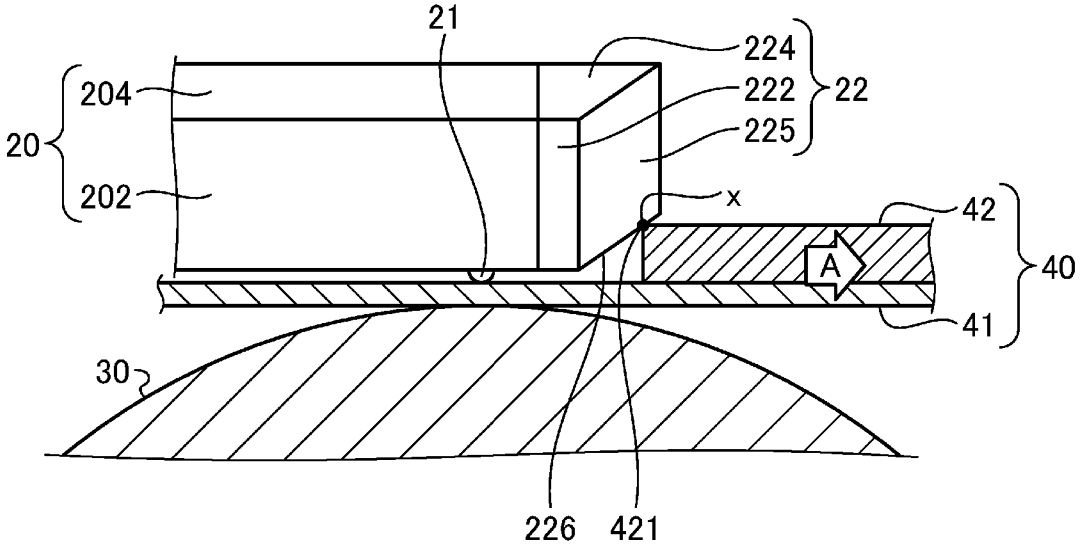
FIG. 7 is an enlarged longitudinal sectional view showing a positional relationship between the sheet guide and the label sheet being conveyed.

A change in relative positions of the sheet guide 22 and the label sheet 4 when the label printer 1 having such a configuration prints on the label sheet 4 will be described below with reference to FIGS. 6 and 7. FIGS. 6 and 7 are enlarged longitudinal sectional views showing a positional relationship between the sheet guide 22 attached to the thermal head 20 and the label sheet 4 being conveyed.

FIG. 6 shows a state where the heating element 21 provided in the thermal head 20 reaches the side 421 of the label 42 on the upstream side in the sheet conveying direction. Meanwhile, FIG. 7 shows a state where the heating element 21 is in contact with the backing sheet 41 and the side 226 and the side 421 intersect with each other. In the state in FIG. 7, the upper surface 204 of the thermal head 20 is inclined downward from back to front in the drawing.

As shown in FIG. 6, the label sheet 4 is sandwiched between the heating element 21 and the platen roller 30. A protruding dimension of the heating element 21 from the lower surface 201 of the thermal head 20 is smaller than a thickness of the label 42.

Here, if a side (hereinafter, referred to as a side a) of the lower surface of the thermal head on the downstream side in the sheet conveying direction is parallel to the width direction of the label as in the related art, the entire side a collides with an upper surface of the backing sheet supported by the platen roller in one breath, and noise is generated.

However, in the present embodiment, as shown in FIG. 7, the thermal head 20 gradually inclines while moving the intersection x between the side 226 and the side 421 of the label 42 on the upstream side in the sheet conveying direction along the side 226 of the sheet guide 22 on the downstream side in the sheet conveying direction, and gradually approaches the backing sheet 41 on the platen roller 30. Therefore, when the heating element 21 moves from a surface of the first label 42 due to conveying of the label sheet 4 and comes into contact with the backing sheet 41 between the first label 42 and the second label 42 adjacent thereto, a part of the side 226 of the sheet guide 22 is also in contact with an edge on a surface side of the first label 42. As a result, the entire side 226 can be prevented from hitting the backing sheet in one breath. Therefore, according to the present embodiment, generation of the noise can be prevented.

As described above, according to the present embodiment, the label printer 1 can be provided in which the noise is less likely to be generated when the thermal head 20 comes into contact with the backing sheet between the label 42 and the label 42.

In the above embodiment, the guide portion (the sheet guide 22) is provided over an entire area of the thermal head 20 in the width direction, but implementations are not limited thereto. In addition, in the above embodiment, the edge portion (the side 226) is present over the entire area of the thermal head 20 in the width direction, but the implementations are not limited thereto.

Further, in the above embodiment, the edge portion (side 226) is illustrated to be a linear shape. However, the edge portion is merely an example, is shown roughly or schematically for easy understanding, and implementations are not limited thereto.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A label printer, comprising:

a thermal head including a linear heating element that prints on a label sheet in which labels are attached on a strip-shaped backing sheet at a predetermined interval, the thermal head configured to swing with respect to a platen roller configured to support the label sheet at a printing position; and a guide including an edge portion substantially parallel to a surface of the thermal head having the linear heating element provided thereon and inclined with respect to the linear heating element integrally provided downstream of the thermal head in a sheet conveying direction, the guide having a surface on a downstream side in the sheet conveying direction inclined with respect to a width direction of the label sheet.

2. The label printer according to claim 1, wherein the edge portion of the guide has a length so that a part of the edge portion is in contact with an edge of a surface of a first label when the heating element of the thermal head moves from the surface of the first label due to conveying of the label sheet and comes into contact with the strip-shaped backing sheet between the first label and a second label adjacent thereto.

3. The label printer according to claim 1, wherein the guide is provided over an entire area of the thermal head in a width direction thereof.

4. The label printer according to claim 3, wherein the edge portion is present over the entire area of the thermal head in the width direction thereof.

5. The label printer according to claim 1, wherein the edge portion has a substantially linear shape.

6. The label printer according to claim 1, wherein a lower surface and an upper surface of the guide each have a substantially trapezoidal shape.

7. The label printer according to claim 1, wherein the lower surface of thermal head and the lower surface of the guide are substantially parallel.

8. A thermal printer configured to print labels, comprising:

a platen roller configured to support a label sheet comprising labels on a strip-shaped backing sheet at a printing position;

a thermal head including a linear heating element that prints on the label sheet, the thermal head configured to swing with respect to the platen roller; and a guide including an edge portion substantially parallel to a surface of the thermal head having the linear heating element provided thereon and inclined with respect to the linear heating element integrally provided downstream of the thermal head in a sheet conveying direction, the guide having a surface on a downstream side in the sheet conveying direction inclined with respect to a width direction of the label sheet.

9. The thermal printer according to claim 8, wherein the edge portion of the guide has a length so that a part of the edge portion is in contact with an edge of a surface of a first label when the heating element of the thermal head moves from the surface of the first label due to conveying of the label sheet and comes into contact with the strip-shaped backing sheet between the first label and a second label adjacent thereto.

10. The thermal printer according to claim 8, wherein the guide is provided over an entire area of the thermal head in a width direction thereof.

11. The thermal printer according to claim 10, wherein the edge portion is present over the entire area of the thermal head in the width direction thereof.

12. The thermal printer according to claim 8, wherein the edge portion has a substantially linear shape.

13. The thermal printer according to claim 8, wherein a lower surface and an upper surface of the guide each have a substantially trapezoidal shape.

14. The thermal printer according to claim 8, wherein the lower surface of thermal head and the lower surface of the guide are substantially parallel.

15. A label printer, comprising:

a platen roller configured to support a label sheet comprising labels on a strip-shaped backing sheet;

a thermal head including a linear heating element that prints on the label sheet, the thermal head configured to swing with respect to the platen roller;

a guide including an edge portion substantially parallel to a surface of the thermal head having the linear heating element provided thereon and inclined with respect to the linear heating element integrally provided downstream of the thermal head in a sheet conveying direction, the guide having a surface on a downstream side in the sheet conveying direction inclined with respect to a width direction of the label sheet;

a cutter to cut the label sheet after printing; and a discharge port through which a printed label is conveyed.

16. The label printer according to claim 15, wherein the edge portion of the guide has a length so that a part of the edge portion is in contact with an edge of a surface of a first label when the heating element of the thermal head moves from the surface of the first label due to conveying of the label sheet and comes into contact with the strip-shaped backing sheet between the first label and a second label adjacent thereto.

17. The label printer according to claim 15, wherein the guide is provided over an entire area of the thermal head in a width direction thereof.

18. The label printer according to claim 17, wherein the edge portion is present over the entire area of the thermal head in the width direction thereof.

19. The label printer according to claim 15, wherein the edge portion has a substantially linear shape.

20. The label printer according to claim 15, wherein a lower surface and an upper surface of the guide each have a substantially trapezoidal shape.

* * * * *